(12) United States Patent
Tullis

(10) Patent No.: US 6,563,101 B1
(45) Date of Patent: May 13, 2003

(54) NON-RECTILINEAR SENSOR ARRAYS FOR TRACKING AN IMAGE

(76) Inventor: Barclay J. Tullis, 1795 Guinda St., Palo Alto, CA (US) 94303

(*) Notice: Subject to any disclaimer, the term of this patent is extended or adjusted under 35 U.S.C. 154(b) by 0 days.

(21) Appl. No.: 09/487,100

(22) Filed: Jan. 19, 2000

(51) Int. Cl.$^7$ ............................................. H01L 27/00
(52) U.S. Cl. ................................. 250/208.1; 348/275
(58) Field of Search .......................... 250/208.1, 208.6, 250/208.2, 203.4, 206.5; 348/275, 315, 308

(56) References Cited

U.S. PATENT DOCUMENTS

| | | | |
|---|---|---|---|
| 4,409,982 A | 10/1983 | Plesset et al. | 128/660 |
| 4,582,065 A | 4/1986 | Adams | 128/660 |
| 4,686,408 A | 8/1987 | Ishiyama | 310/334 |
| 4,734,963 A | 4/1988 | Ishiyama | 29/25.35 |
| 4,779,211 A * | 10/1988 | March | 364/559 |
| 4,847,478 A | 7/1989 | Sugiura | 250/201 |
| 5,144,498 A | 9/1992 | Vincent | 359/885 |
| 5,161,027 A | 11/1992 | Liu | 358/231 |
| 5,288,993 A | 2/1994 | Bidiville et al. | 250/221 |
| 5,453,623 A | 9/1995 | Wong | 250/363.03 |
| 5,500,692 A | 3/1996 | Onozuka | 348/759 |
| 5,534,859 A | 7/1996 | Meyer | 340/870.37 |
| 5,578,813 A | 11/1996 | Allen et al. | 250/208.1 |
| 5,644,139 A | 7/1997 | Allen | 250/557 |
| 5,686,720 A | 11/1997 | Tullis | 250/208.1 |
| 5,703,356 A | 12/1997 | Bidiville et al. | 250/221 |
| 5,714,773 A * | 2/1998 | Burrows | 257/82 |
| 5,726,670 A | 3/1998 | Tabata et al. | 345/7 |
| 5,729,008 A | 3/1998 | Blalock | 250/208.1 |
| 5,729,009 A | 3/1998 | Dandliker et al. | 250/208.2 |
| 5,748,264 A | 5/1998 | Hegg | 348/746 |
| 5,764,311 A | 6/1998 | Bonde et al. | 348/746 |
| 5,786,804 A * | 7/1998 | Gordon | 345/158 |
| 5,825,044 A | 10/1998 | Allen | 250/557 |
| 6,252,218 B1 * | 6/2001 | Chou | 250/208.1 |

* cited by examiner

Primary Examiner—Kevin Pyo
Assistant Examiner—Seung C. Sohn
(74) Attorney, Agent, or Firm—Trueman H. Denny, III (57) ABSTRACT

Described is an image tracking device that includes an array of light-sensitive elements. A row and a plurality of columns define the array, and an intersection of the row with one of the columns defines a cell frame. The row and columns are arranged in non-rectilinear geometry. Each cell frame has a frame area, and one of the light-sensitive elements is disposed in each cell frame. Each light sensitive element has an active area that generates an electrical signal indicative of light from a portion of an image that is incident within the cell frame containing that element. A fill-factor is defined by the ratio of the active area in a cell frame to the frame area of that cell frame. Two-dimensional motion of an image that is incident on the array can be tracked by whole-frame correlations between successive images from the array thereby eliminating the need for localized correlations throughout the array and subsequent curvilinear transformation algorithms to convert motion data throughout the image from an otherwise rectilinear array into data that is representative of the actual two-dimensional motion of the object. Geometric distortions produced by an optical system that focuses an image on the array or by curved object surfaces can be corrected or compensated for by arranging the array in a non-rectilinear shape that matches the geometric distortion in the image. For example, the array can have a pincushion shape or a barrel shape to compensate for pincushion distortion or barrel distortion respectively. Moreover, the flexible sizing of the active area in each cell frame can be used to compensate for fixed illumination gradients in an image incident on the array. The pitch of cell frames can be made to effect an image resolution that is dependent on position within the array. Active area shapes and positions within cell frames can be varied to reduce errors caused by aliasing.

21 Claims, 9 Drawing Sheets

NON-RECTILINEAR SENSOR ARRAYS FOR TRACKING AN IMAGE

BACKGROUND OF THE INVENTION

The present invention relates generally to image tracking devices. More specifically, the present invention relates to image tracking devices including an array of light-sensitive elements disposed in a non-rectilinear geometry for tracking an image incident on the array.

Articles and publications set forth herein are presented for the information contained therein: none of the information is admitted to be statutory "prior art" and we reserve the right to establish prior inventorship with respect to any such information.

Image sensor arrays are commonplace in modern electronic devices such as displacement sensors, digital cameras, copiers, scanners, facsimile machines, and camcorders, for example. An image sensor array can be a one-dimensional array having a row of light-sensitive elements, or the array can be a two-dimensional array in which there are a plurality of light-sensitive elements disposed in rows and columns of the array. In either case, the array is laid out in a Cartesian geometry (rectilinear geometry) with the light-sensitive elements arranged in an orderly and regular pattern throughout the array. Moreover, the light-sensitive elements are structurally identical to one another and are merely replicated throughout the array. Resulting is a fill-factor that is constant throughout the array. A fill-factor is the ratio of the active light sensing area of a light-sensitive element to the full physical area of the array element.

Image sensor arrays in modern imaging devices such as digital cameras and camcorders, for example, are laid out in a rectilinear geometry. The rectilinear geometry is dictated by semiconductor layout design rules that traditionally require orthogonally arranged circuit elements in order to facilitate semiconductor fabrication. A charge-coupled device (CCD) and a CMOS active pixel sensor are exemplary image sensor arrays that are laid out in a rectilinear geometry.

An optical system that includes one or more lenses can be used to focus an image onto the sensor array. The image can have geometrical distortions such as pincushion distortion, or barrel distortion that are produced by the optical system or by curvature of the object surface being imaged. Additionally, the image can have other field distortions including non-uniform field illumination and non-uniform image resolution. Reducing distortions traditionally requires a lens designer to incorporate additional lens elements, complex lens surface shapes (aspheric lenses), apertures, different or additional glass types, or even filters.

Because the rectilinear geometry of the sensor array has been an accepted design constraint, the burden of correcting the distortions has been placed largely on the optical system. Therefore, as a result, the design variables (the degrees of design freedom) available to the lens designer have been limited to those that can be addressed by changes to the optical system only. However, correcting optical distortions has come at a price, namely, increased cost, weight, size, and complexity of the optical system. Generally, it is desirable to keep the cost of digital imaging devices as low as possible, particularly for products aimed at a consumer mass market. Furthermore, some digital imaging devices are designed to be portable, adding additional design constraints of low weight and small size.

Consequently, there is a need to increase the number of design variables and thereby the degrees of design freedom available to the optics and sensor systems designer. Because geometric distortions are non-rectilinear, one way to increase the number of design variables or degrees of design freedom in the lens and sensor system is to eliminate the design constraint of rectilinear geometry in the sensor. A sensor array having a non-rectilinear geometry can be used to correct geometric distortions in images, reducing the design requirements of the lens. Furthermore, the fill-factors of the light-sensitive elements can be varied with field position to address non-uniform field illumination. And array cell size can be varied with field position to match non-uniform image resolution.

A clever use for image sensor arrays is within sensing devices that track motion of an object. A pattern on a surface of an object is imaged onto an image sensor so that motion of the object causes an image of the surface pattern to traverse an image sensing array.

In a rotary encoder, for example, surface or transmission features of an encoder disc manifest patterns in an image at a detector. Rotation of the encoder disc causes the patterns in the image to traverse an image sensor that is disposed in the rotary encoder. For instance, a light source, such as a light-emitting diode (LED), is used to illuminate the encoder disc so that light from the LED is reflected, scattered off of, or transmitted through the encoder disc to form the image that is incident on the image sensor. The image sensor is laid out in a one-dimensional rectilinear geometry. For example, two to four elements comprising the image sensor can be arranged in a one-dimensional layout (in a straight line).

An example of this in the present art is the use of quadrature signals such as used in shaft encoders to sense angular displacement and direction of a rotating shaft that is coupled to the encoder. However, one disadvantage to a one-dimensional layout of the image sensor when using more than two elements is that coordinate transformation algorithms are required to convert data from the image sensor into data representative of the two-dimensional motion of the image, if maximum resolution is desired.

Another disadvantage of the systematic regularity of a conventional rectilinear layout is that high spatial frequencies in the image can get aliased into the lower spatial frequencies of the data from the image sensor if the distance or pitch length between the elements is more than half the period of those higher frequencies in the image. Aliasing is a disadvantage because it leads to incorrect tracking results.

Therefore, there is a need to overcome disadvantages associated with rectilinear image sensors. Non-rectilinear arrays can be laid out with curvilinear rows and/or columns. For example, when trajectories of object motion are constant as in simple rigid-body motion or in laminar flow, either the rows or columns can parallel the trajectories of image features that move across the array, even in the presence of image distortions. Such a non-rectilinear image sensor array can be used to track a certain two-dimensional motion of an image (incident on the array) without the need to apply coordinate transformation algorithms to make corrections in the post-processing of image data from the image sensor. Furthermore, the spacings between adjacent elements comprising an image sensor array, the position of each active photo sensor element within its cell of the array, and the fill-factor of each element of the array can be adjusted by design to frustrate aliasing.

SUMMARY OF THE INVENTION

The problems and limitations associated with rectilinear image sensors are addressed by various aspects of the present invention. The problem with geometrical distortions inherent in an optical system is addressed by positioning photosensors in an array having a non-rectilinear geometry. The array can have a shape that compensates for anticipated geometric distortion in an image; for example, the array can have a pincushion geometry to compensate for pincushion distortion in the image. Problems with field-dependent illumination and resolution are addressed by varying the sizes of the array elements and/or by varying the fill-factors of individual elements. Fill-factor is defined as the ratio of light-sensitive area within an array element to the area of the whole array element. For example, in regions of the image where illumination fall-off is present, the active areas of the light-sensitive elements in those regions can be increased to compensate for the illumination fall-off (relative to active area sizes in regions with less or no fall-off). This can be done by increasing fill-factor while holding cell area constant, by increasing cell area while holding fill-factor constant, or by increasing both cell area and fill-factor. In a second example, resolution can be increased by decreasing cell area. Naturally there is a relationship between illumination control and resolution control that sometimes results in requiring a tradeoff to be made.

Additionally, the problems associated with aliasing of the image data from a moving object are addressed by varying the fill-factors and by varying the positions of the light-sensitive elements within the cell elements of the array so that the spacings between the active area elements of the array vary randomly, with some spacings being greater and some less than the average pitch.

For row and column data from an imaging array, it is desirable to minimize or eliminate the need for coordinate transformation algorithms and related circuitry to convert data from row and column dimensional representations of the image back to two-dimensional representations in object coordinates or to coordinates of the object motion. The present invention addresses that need by using an image sensor array that is laid out in a non-rectilinear geometry that can be formed to match the anticipated geometry of the image motion, even in the case of a distorted image.

For a simple example, the image sensors of the present invention can be arranged in a two-dimensional curvilinear geometry such that object features in the two-dimensional image travel along only the rows or only the columns of the array of image sensor elements as the object moves. This arrangement would eliminate the need to perform two-dimensional image correlation algorithms to track motion, as correlations along only the rows or columns respectively would be sufficient. Moreover, in such a simplifying arrangement, the image sensor elements can be arranged in a two-dimensional non-rectilinear array having rows and columns. The two-dimensional image motion along columns can be tracked by electrically processing image data from each of the rows in the column. Alternatively, the two-dimensional image motion along rows can be tracked by electrically processing image data from each of the columns in the row. Row elements in a column can be combined if the image data is relatively constant along the column, and image motion is along the rows. Column elements in a row can be combined if the image data is relatively constant along the rows, and image motion is along the columns.

In general with image motion having components along both rows and columns, electrical processing is required between nearest neighbors both along columns and rows as well as along diagonals. In any case, the non-rectilinear geometry of the image sensing array of the present invention simplifies image tracking by customizing the layout of the rows and columns of the array to conform to the natural motion inherent in the (distorted) image to be tracked, by sizing pixels throughout the array such that increments of motion become a fraction of local pixel size throughout the array. By assuming that motion throughout the field of view is constant in terms of units of local pixel size, motion can be calculated by simply adding nearest neighbor correlations over the whole array. As a result, image tracking is simplified, by permitting nearest-neighbor correlations to be simply added over all elements, and by eliminating coordinate or other geometrical transformations to correct for geometrical image distortions or non-linear motions in an image.

A general discussion of motion tracking with imaging arrays can be found in the following issued U.S. Pat. Nos. 5,578,813; 5,644,139; 5,686,720; 5,729,008; and 5,825,044. Unlike the image sensing array of the present invention, these issued patents teach the use of rectilinear photo-sensor arrays. Furthermore, these patents teach correlation calculations between nearest neighbor cells between successive images, and sum the results over the cells in the array. Summing in this manner yields accurate results only if motion within the image field is constant in magnitude and direction throughout the area of the array, as when there is no geometric image distortion and the motion is that of rigid-body motion within the image field. If geometric image distortion were present, the motion in the neighborhood of each cell would be different from that of more distant cells, requiring that motion be tracked separately for each neighborhood rather than combined by summing. These "point" measures of motion about the array would then have to be "assembled" to produce a composite result. Or the "point" measures of motion could be used as such to represent a motion map over the field of view. Or, alternatively, a-priori knowledge of the geometric distortion could be applied to correct the individual motions measured by the correlations of the many cell neighborhoods, and only thereafter the corrected individual cell results could be summed over the array to produce a measure of "rigid-body" motion within the image field.

Broadly, the present invention provides an image tracking device that includes a plurality of light-sensitive elements that are positioned to define an array having at least one row and a plurality of columns arranged in a non-rectilinear geometry. A cell frame is defined by the intersection of the row with one of the columns. Each cell frame has a frame area and one of the light-sensitive elements is disposed in each cell frame. Each of the light-sensitive elements has an active area and is operative to generate an electrical signal indicative of a portion of an image of an object incident on the active area of that light-sensitive element. The ratio of the active area of a light-sensitive element disposed in a cell frame to the frame area of that cell frame defines a fill-factor. A larger fill-factor results in more of the frame area being occupied by the active area of the light-sensitive element disposed in that cell frame.

In one embodiment of the present invention, the light-sensitive element can be a photodiode, a photocell, a P-I-N diode, a photo transistor, a charge-coupled device (CCD), a CMOS active pixel sensor, an amorphous photo sensor, a solar cell, a photovoltaic device, or a photoconductive device.

In another embodiment of the present invention, the array includes at least a portion of a circularly symmetric geometry having a center point of symmetry. In one embodiment the array includes a plurality of rows, each row arranged at a constant radius from the center point of symmetry and pitch between the rows decreases with increasing radial distance from the center point of symmetry, so that the frame area is constant across the array. The center point of symmetry can be substantially coincident with an axis of rotation of an image of an object.

In one embodiment of the present invention, the array has a pincushion geometry so that features on a concave spherical object can be imaged onto the array. In another embodiment the array has a barrel geometry so that features on a convex spherical object can be imaged onto the array.

In one embodiment of the present invention, the geometry of the array is laid out in a pattern that can be a pincushion, a barrel, a keyhole, a trapezoid, or a parallelogram to compensate for geometric distortions in an image incident on the array.

In another embodiment, cell sizes (and respective active areas) are both decreased in regions where higher image resolution is desired and vice versa.

In other embodiments of the present invention, optical distortions and illumination fall-off in an image incident on the array are compensated for by selecting the frame area and/or by selecting the size and/or shape of the active area.

In one embodiment of the present invention, the distance between cells frames in adjacent columns define a column cell pitch, and the distance between cell frames in adjacent rows defines a row cell pitch. The light-sensitive element in each cell frame is positioned or shaped randomly in that cell frame or varied systematically so that aliasing is minimized (i.e., for images having some spatial periods less than about twice the row cell pitch or less than about twice the column cell pitch). Alternatively, the active area of the light-sensitive element in each cell frame can be randomized so that the shape and/or fill-factor vary randomly throughout the array and aliasing is minimized for images having spatial periods less than about twice the row cell pitch or less than about twice the column cell pitch.

Other aspects and advantages of the present invention will become apparent from the following detailed description, taken in conjunction with the accompanying drawings, illustrating by way of example the principles of the present invention.

DETAILED DESCRIPTION

In the following detailed description and in the several figures of the drawings, like elements are identified with like reference numerals.

As shown in the drawings for purpose of illustration, the present invention is embodied in an image tracking device that includes a plurality of light-sensitive elements that are configured to define an array. The array includes a row and a plurality of columns that intersect the row. The row and the columns are arranged in a non-rectilinear geometry. An intersection of the row with one of the columns defines a cell frame. Distance between adjacent cell frames in the row defines a cell pitch length along the row. Each cell frame has a frame area, and one of the light-sensitive elements is disposed in each cell frame. Each of the light-sensitive elements has an active area and is operative to generate an electrical signal indicative of a portion of an image of an object incident on the active area of that light-sensitive element. The ratio of the active area of a light-sensitive element disposed in a cell frame to the frame area of that cell frame defines a fill-factor. A larger fill-factor results in more of the frame area being occupied by the active area of the light-sensitive element. Conversely, a smaller fill-factor results in less of the frame area being occupied by the active area of the light-sensitive element. The array can additionally have multiple rows, and distance between adjacent cell frames along a column defines a cell pitch length along the column. Cell pitch length may vary throughout the array.

The image tracking device of the present invention can compensate for geometrical distortions in an image by arranging the array in a non-rectilinear geometry that matches the geometric distortion in the image. For example, the array can have a barrel geometry to match barrel distortion in an image that is incident on the array. Image resolution can be tailored across the array by varying cell pitches. Additionally, image illumination non-uniformities can be compensated for by adjusting the fill-factors of the active areas of the light-sensitive elements within their respective cell frames. In regions of an image having illumination fall-off, the array can be configured to increase the active area of the light-sensitive elements in that region to compensate for the illumination fall-off. By using the array to compensate for image distortions, the weight, size, complexity, and cost of the optical system used to form the image can be reduced.

Moreover, the image tracking device of the present invention addresses problems associated with the use of rectilinear image sensing devices that track motion, rotation, displacement, velocity, and position. Aliasing caused by some spatial periods in an image being shorter than twice the spacing (pitch length) between the active areas of the light-sensitive elements is addressed by varying the shapes and positions of the light-sensitive elements within their respective cell frames. One advantage to using the array to correct aliasing is that anti-aliasing algorithms and/or circuitry can be reduced or eliminated resulting in lower complexity, size, and cost in a device incorporating the present invention. Furthermore, an additional advantage of the image tracking device of the present invention is that it can reduce or eliminate the need for localized correlations throughout the array and subsequent geometrical transformation algorithms. This is accomplished by using a non-rectilinear array of image sensors so that image data generated throughout the array is uniformly indicative of any two-dimensional motion of the object imaged on the array. As previously mentioned, lower complexity, size, and cost of a device incorporating the present invention can be realized by reducing or eliminating the need for transformation algorithms and/or circuitry. Furthermore, greater precision of motion tracking can be achieved.

Figure 1A:
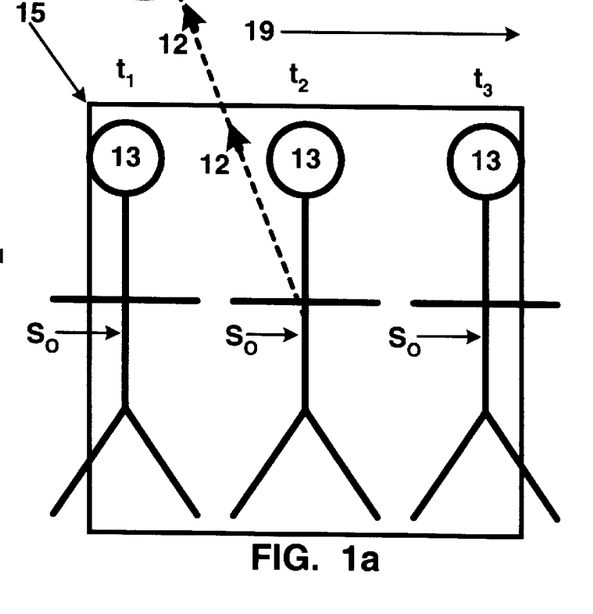
FIG. 1a is an illustration of an image tracking device that includes a non-rectilinear image sensor array according to the present invention.

Referring to FIG. 1a, there is provided in accordance with the present invention an image tracking device 1. The image tracking device 1 includes a plurality of light-sensitive elements 2 that are configured to define an array 3. The array 3 includes a row 5 and a plurality of columns 7, with the row 5 and the columns 7 arranged in a non-rectilinear geometry. The intersection of the row 5 with one of the columns 7 defines a cell frame 9. Each cell frame 9 has a light-sensitive element 2 disposed therein. The shape of the cell frames varies throughout the array 3.

The array 3 must have at least one row 5; however, FIG. 1a illustrates the array 3 having six rows. The number of rows required will vary based on the application in which the array 3 is to be used. For instance, in FIG. 1a, the six rows are required to accommodate an image 17 that is incident on the array 3.

Figure 1B:
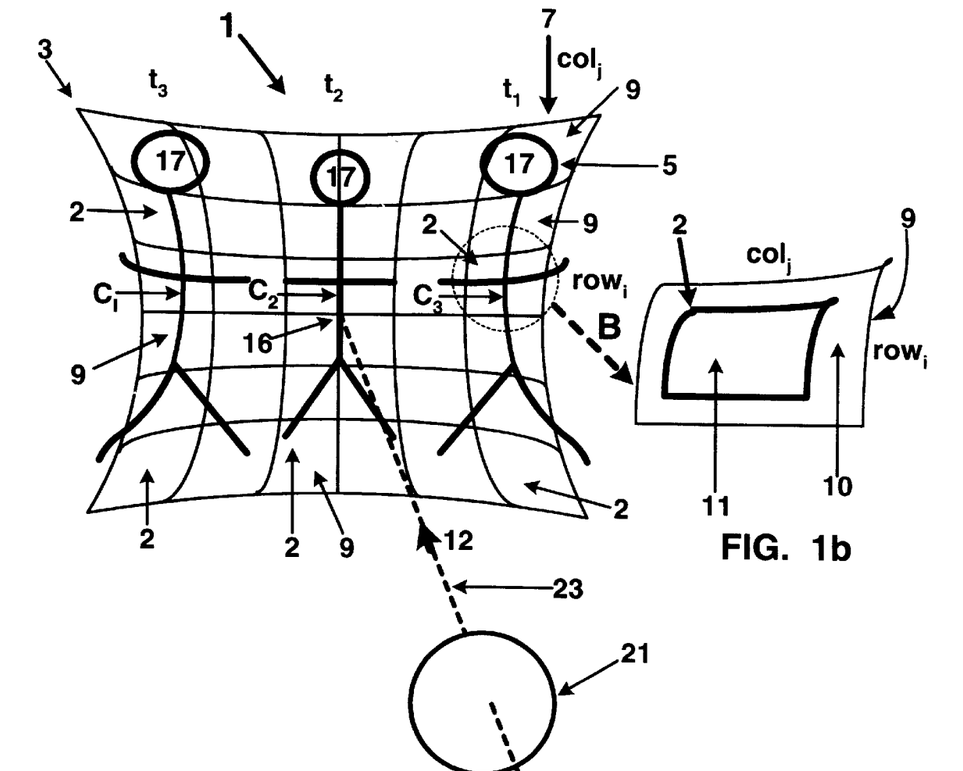
FIG. 1b is an illustration of a light-sensitive element disposed in a cell frame according to the present invention.

FIG. 1b illustrates a detailed view of the cell frame 9 located at $col_j$ and $row_i$ of the array 3, as indicated by the dashed arrow B. The cell frame 9 has a frame area 10. The light-sensitive element 2 is disposed within the cell frame 9 and has an active area 11. The light-sensitive element 2 is operative to generate an electrical signal that is responsive to a portion of an image of an object (not shown) that is incident on the active area 11. The ratio of the active area 11 to the frame area 10 defines a fill-factor (i.e. the fill-factor= Area of 11÷Area of 10) A larger fill-factor results in more of the frame area 10 being occupied by the active area 11. Although FIG. 1b illustrates the light-sensitive element 2 having dimensions that are smaller than the cell frame 9, the light-sensitive element 2 can be identical in dimension to the cell frame 9 in which case the fill-factor would be unity ( fill-factor=1) since the active area 11 would be equal to the cell area 10. If, the area 11 of the light-sensitive element 2 is less than that of the area 10 of the cell frame 9, it need not have the same shape as the cell frame 9.

The shape and area of the active area 11 as illustrated in FIG. 1b can vary throughout the array 3 such that in any given cell frame 9 the active area 11 in that cell frame 9 may or may not be identical in shape or in area to the active areas in adjacent cell frames. Moreover, the array 3 can be configured such that all of the active areas in the array 3 have different shapes and/or areas.

Figure 1C:
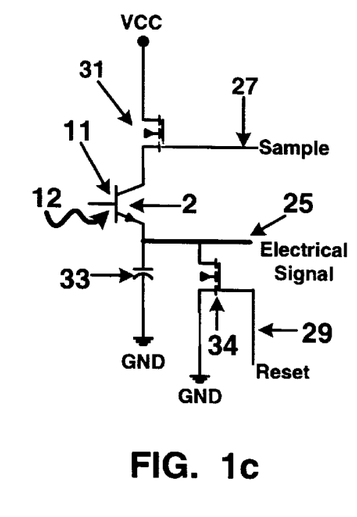
FIG. 1c is an illustration of an electrical schematic of the light-sensitive element of FIG. 1b.

The light-sensitive element 2 can be a discrete or an integrated electronic device such as a photodiode, a P-I-N photodiode, a photocell, a phototransistor, a charge-coupled device (CCD), a CMOS active pixel sensor, an amorphous photosensor, a solar cell, a photovoltaic device, or a photoconductive device, for example. FIG. 1c illustrates one example of a schematic of an electronic device that can be used to implement the light-sensitive element 2. In FIG. 1c the light-sensitive element 2 is a phototransistor. Light rays 12 from a portion of an image of an object (not shown) are incident on the active area 11. An electrical signal that is responsive to the light rays 12 is generated at an output node 25 of the light-sensitive element 2. Additionally, control circuits can be used to sample the electrical signal and to reset the electrical signal to a predetermined value such as VCC or GND for example.

In FIG. 1c field-effect transistors (FET) 31 and 34 have their gate nodes connected to a sample signal 27 and a reset signal 29 respectively. The sample signal 27 turns FET 31 on and allows current to flow thru the light-sensitive element 2 thereby charging a capacitor 33 so that the electrical signal is communicated to the output node 25. With the sample signal set so that FET 31 is off, FET 34 can be turned on by the reset signal 29 thereby discharging capacitor 33 to GND thru the FET 34. As a result, the electrical signal at the output node 25 can be reset to a known value such as logic zero, for example. The electrical schematic illustrated in FIG. 1c is only an example of one possible implementation of control circuitry for the light-sensitive element 2. Other methods known to those skilled in the electronic arts may be used to implement the light-sensitive element 2 and its related control circuitry. The present invention should not be construed as being limited to the embodiment illustrated in FIG. 1c.

Referring again to FIG. 1a, an optical system 21 focuses light rays 12 from features on a moving object 13 in an object plane 15 into a moving image 17 that is incident on the array 3. The array 3 is coincident with an image plane (not shown) of the optical system 21. A center point 16 of the array 3 can be aligned with an optical axis 23 of the optical system 21. However, the array 3 need not be aligned with the optical axis 23. The optical system can include optical elements such as lenses, mirrors, filters, polarizers, and beam splitters, for example. The direction of motion of the object 13 at discrete times $t_1$, $t_2$, and $t_3$ is shown by arrow 19. As the image 17 moves across the array 3, the image can be tracked by electronically processing the electrical signals from the light-sensitive elements 2 disposed in cell frames 9 of the array 3. Although arrow 19 shows motion in a horizontal direction, the object 13 and the image 17 can have a motion vector having both vertical and horizontal components and may vary with time and even position in the object plane 15. The image of the object 13 may be inverted or not depending on the design of the optical system 21; in FIG. 1a, it is not inverted.

The illustrated object 13 includes a straight object feature $S_O$ (a trunk portion of the objects body) that remains straight at the discrete times $t_1$, $t_2$, and $t_3$. The straight object feature $S_O$ is shown subject to geometrical distortion by the optical system 21. The corresponding image 17 has a curved image feature $C_1$ at time $t_1$. As the image 17 moves across the array 3, the curved image feature $C_1$ becomes a straight image feature $C_2$ at time $t_2$. Finally, as the image 17 continues to move across the array 3, the straight image feature $C_2$ becomes the curved image feature $C_3$ at time $t_3$. The non-rectilinear geometry of the image tracking device 1 compensates for the geometrical distortion of the optic the light-sensitive elements 2 in cell frames 9 that conform to the curvature of the image 17 produced by the optical system 21. At the center point 16 of the array 3 where the image 17 has the straight image feature $C_2$, the array 3 exhibits minimal curvature. On the other hand, the array 3 exhibits greater curvature in positions that are outward of the center point 16 where the image 17 has the curved image features $C_1$ and $C_3$. The desired non-rectilinear characteristics of the array 3 will depend on the application and the type of distortion produced by the optical system 21. For example, the array 3 in FIG. 1a has a pincushion geometry that is adapted to compensate for pincushion distortion. However, the array 3 could have a barrel geometry to compensate for barrel distortion as will be discussed below.

Figures 2, 3:
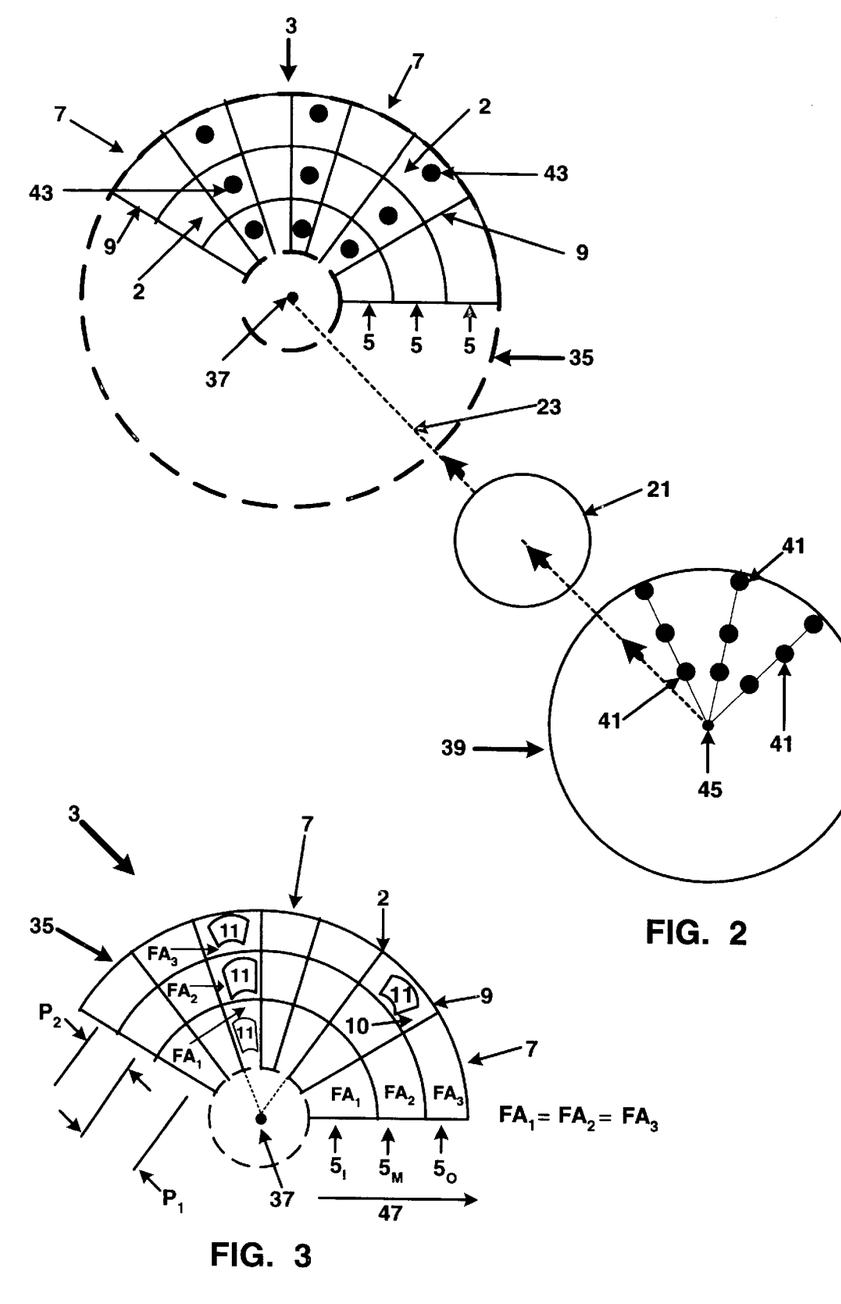
FIG. 2 is an illustration of an array having a circularly symmetric geometry with a center point of symmetry according to the present invention.
FIG. 3 is an illustration of the array of FIG. 2 wherein row pitch decreases and the frame area is constant with increasing radial distance from the center point of symmetry according to the present invention.

In one embodiment of the present invention as illustrated in FIG. 2, the array 3 includes at least a portion of a circularly symmetric geometry 35 having a center point of symmetry 37. The center point of symmetry 37 can be coincident with an axis of rotation 45 of an object 39. Additionally, an optical system 21 can have its optical axis 23 coincident with the axis of rotation 45 and the center point of symmetry 37. Although the array 3 is shown having a plurality of rows 5, the array 3 can have a single row 5.

The circular symmetry of the array 3 can be used to track motion of a pattern 41 that is disposed in radially outward positions from the axis of rotation 45 of the object 39. An image 43 of the pattern 41 is focused onto the array 3 by the optical system 21. Rotation of the object 39 about its axis of rotation 45 results in the image 43 of the pattern 41 traveling along the rows 5 of the array 3. Consequently, the two-dimensional motion tracking of the pattern 41 is simplified by the non-rectilinear arrangement of the light-sensitive elements 2 in the rows 5 and columns 7 in the array 3.

One advantage of the embodiment illustrated in FIG. 2 is that the inherent two-dimensional configuration of the array 3 allows tracking of the two-dimensional image motion without the need for geometrical transformation algorithms that are required when otherwise using one-dimensional rectilinear image sensor arrays. Moreover, if the size of the pattern 43 changes with radial distance from the axis of rotation 45 the corresponding active areas of the light-sensitive elements 2 in the rows 5 can be increased or decreased to compensate for the change in pattern size. (This is the reverse of using a non-regular array with column pitch length made to decrease with increasing radius, if object features are relatively constant in scale with radial position).

In another embodiment of the present invention as illustrated in FIG. 3, the array 3 has a plurality of rows $5_I$, $5_M$, and $5_O$. The rows $5_I$, $5_M$, and $5_O$ are spaced apart by a row pitch that decreases with increasing radial distance from the center point 37 as shown by arrow 47 so that the frame area FA of the cell frames 9 is constant across the array 3. Therefore, a pitch $P_1$ between the innermost two rows $5_I$ and $5_M$ is greater than a pitch $P_2$ between the outermost two rows $5_M$ and $5_O$ ($P_1 > P_2$) and a frame area $FA_1$ in the innermost row $5_I$ is equal to a frame area $FA_2$ in the middle row $5_M$ which is equal to a frame area $FA_3$ of the outermost row $5_O$ ($FA_1 = FA_2 = FA_3$). One benefit of this arrangement, assuming that active areas 11 are also held constant, is that signal strengths from the active areas 11 can more easily be held representative of the brightness across the object.

Figure 4:
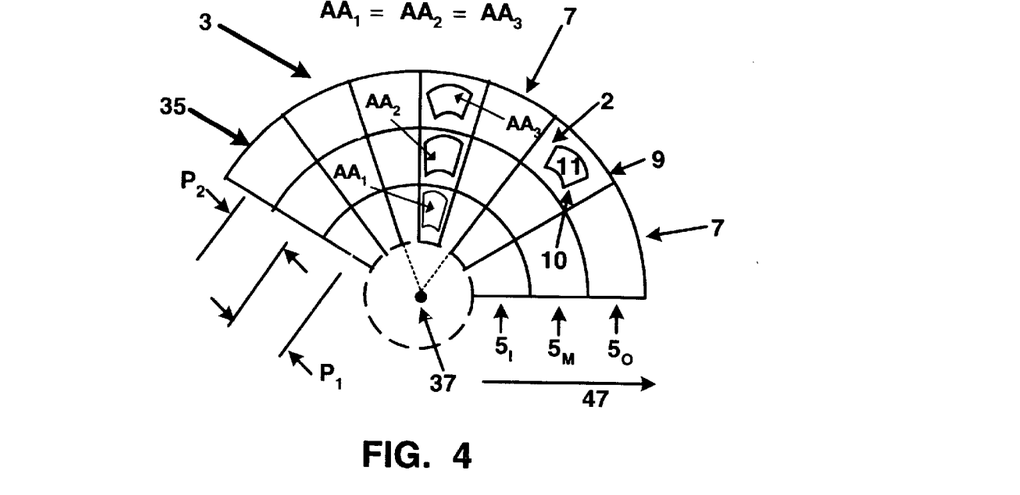
FIG. 4 is an illustration of the array of FIG. 2 wherein row pitch is constant and the fill-factor decreases with increasing radial distance from the center point of symmetry according to the present invention.

In one embodiment, as illustrated in FIG. 4, the array 3 has a plurality of rows $5_I$, $5_M$, and $5_O$ that have a constant row pitch at increasing radial distance 47 from the center point of symmetry 37. Therefore, the pitch $P_1$ between the innermost two rows $5_I$ and $5_M$ is equal to the pitch $P_2$ between the outermost two rows $5_M$ and $5_O$ ($P_1 = P_2$). However, the frame area 10 increases with increasing radial distance 47 from the center point of symmetry 37 while the fill-factor decreases so that the active areas 11 of the light-sensitive elements 2 in the cell frames 9 are constant across the array 3. Subsequently, an active area $AA_1$ in the innermost row $5_I$ is equal to an active area $AA_2$ in the middle row $5_M$ which is equal to an active area $AA_3$ in the outermost row $5_O$ ($AA_1 = AA_2 = AA_3$). As before, by holding the active areas 11 constant, the signal strengths from the active areas 11 can more easily be held representative of the brightness across the object.

Although only three rows are shown in FIGS. 3 and 4, the array 3 in FIGS. 3 and 4 can have any number of rows. For instance, the number of rows required can depend on the size of the image field that is incident on the array 3 or on the resolution desired.

Figure 5:
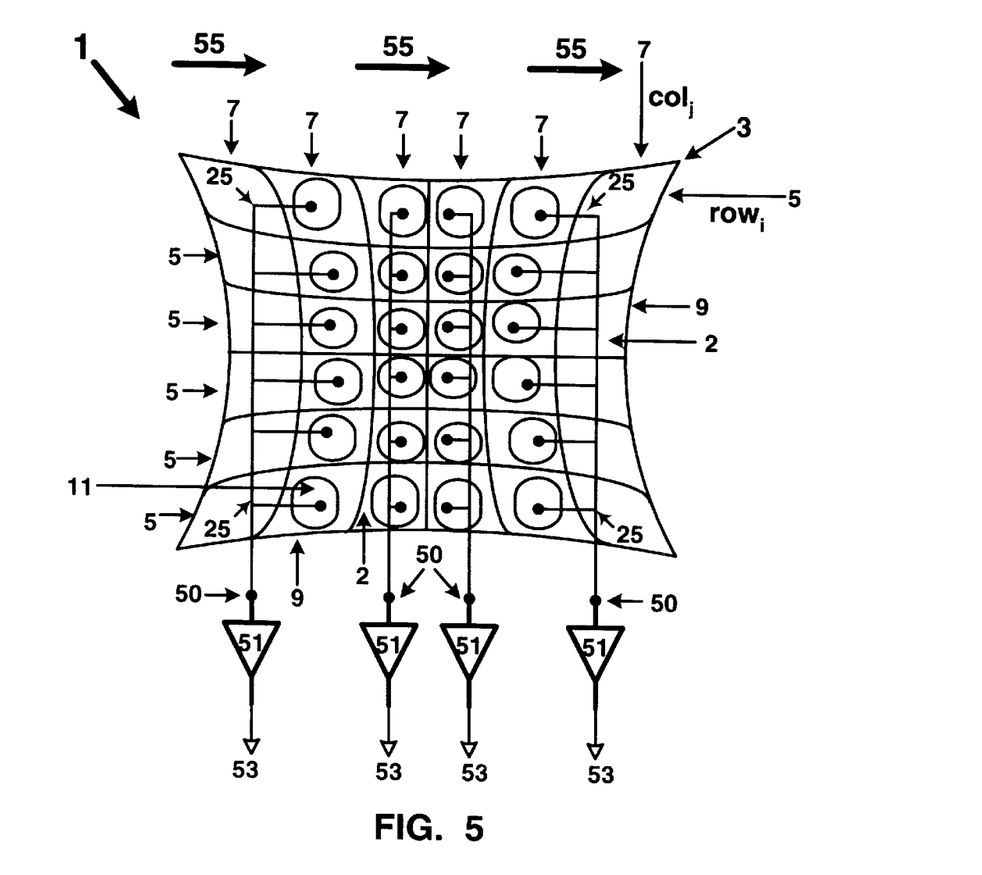
FIG. 5 is an illustration of the array of FIG. 1 wherein electrical signals from each light-sensitive element in a column of the array are combined and column signals are compared to track image motion along the rows of the array according to the present invention.

Referring to FIG. 5, the array 3 of the image tracking device 1 can include a column signal unit 51 for generating a column signal 53. The output node 25 of each light-sensitive element 2 in a column 7 of the array 3 is connected to an input 50 of the column signal unit 51 so that the electrical signals from those light-sensitive elements are electrically communicated to the column signal unit 51. Although only one input 50 is shown, the column signal unit 51 can have more than one input 50. For example, the column signal unit 51 can have six inputs 50 for connection to each output node 25 of the six light-sensitive elements 2 in each column 7 of the array 3 in FIG. 5.

The column signal 53 is indicative of a combined value for all of the electrical signals in communication with the column signal unit 51. Motion of an image along the rows of the array as indicated by arrows 55 can be tracked by correlating the column signal 53, from each column 7 of the array 3, between successive image frames. The exact implementation of the circuitry for the column signal unit 51 will be application specific. For example, the column signal unit 51 may contain electronics that sum or integrate the electrical signals from the light-sensitive elements 2 to generate the column signal 53. Furthermore, the implementation of the column signal unit 51 will also depend on whether the electrical signals from the light-sensitive elements 2 are analog or digital signals.

Figure 6:
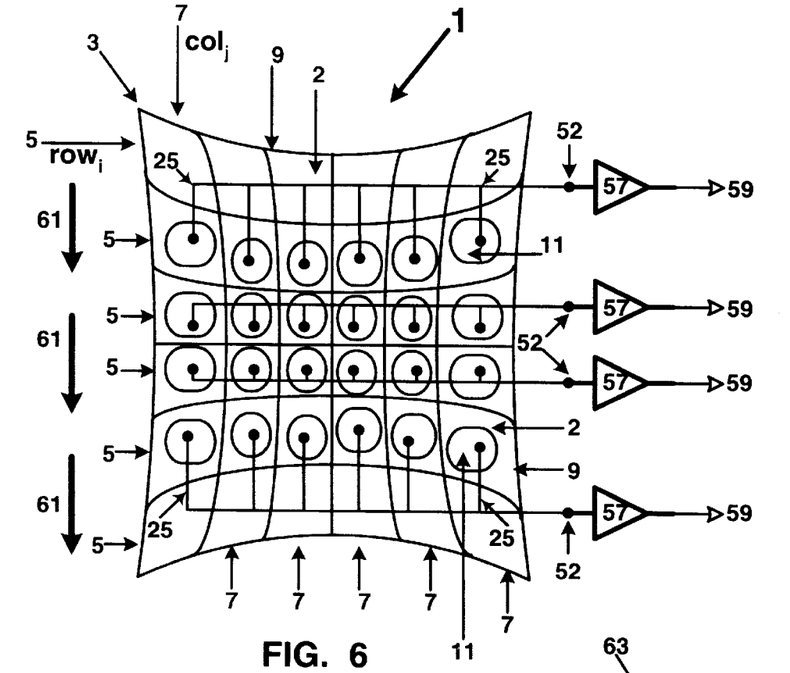
FIG. 6 is an illustration of the array of FIG. 1 wherein electrical signals from each light-sensitive element in a row of the array are combined and row signals are compared to track image motion along the columns of the array according to the present invention.

In another embodiment of the present invention, as illustrated in FIG. 6, the array 3 of the image tracking device 1 can include a row signal unit 57 for generating a row signal 59. The output node 25 of each light-sensitive element 2 in a row 5 of the array 3 is connected to an input 52 of the row signal unit 57 so that the electrical signals from those light-sensitive elements are electrically communicated to the row signal unit 57. Although only one input 52 is shown, the row signal unit 57 can have more than one input 52. For instance, the row signal unit 57 can have six inputs 52 for connection to each output node 25 of the six light-sensitive elements 2 in each row 5 of the array 3 in FIG. 6.

The row signal 59 is indicative of a combined value for all of the electrical signals in communication with the row signal unit 57. Motion of an image along the columns of the array as indicated by arrows 61 can be tracked by correlating the row signal 59, from each row 5 of the array 3, between successive image frames. The exact implementation of the circuitry for the row signal unit 57 will be application specific. For example, the row signal unit 57 may contain electronics that sum or integrate the electrical signals from the light-sensitive elements 2 to generate the row signal 59. Furthermore, the implementation of the row signal unit 57 can depend on whether the electrical signal generated by the light-sensitive element 2 is an analog signal or a digital signal.

For example, a CCD or CMOS photosensing device generating an analog signal, the row signal unit 57 or the column signal unit 51 can be adapted to process an analog signal. In contrast, a CMOS active pixel sensor can include analog-to-digital converters to generate a digital signal, and consequently, the row signal unit 57 or the column signal unit 51 can be adapted to process a digital signal.

Figure 7:
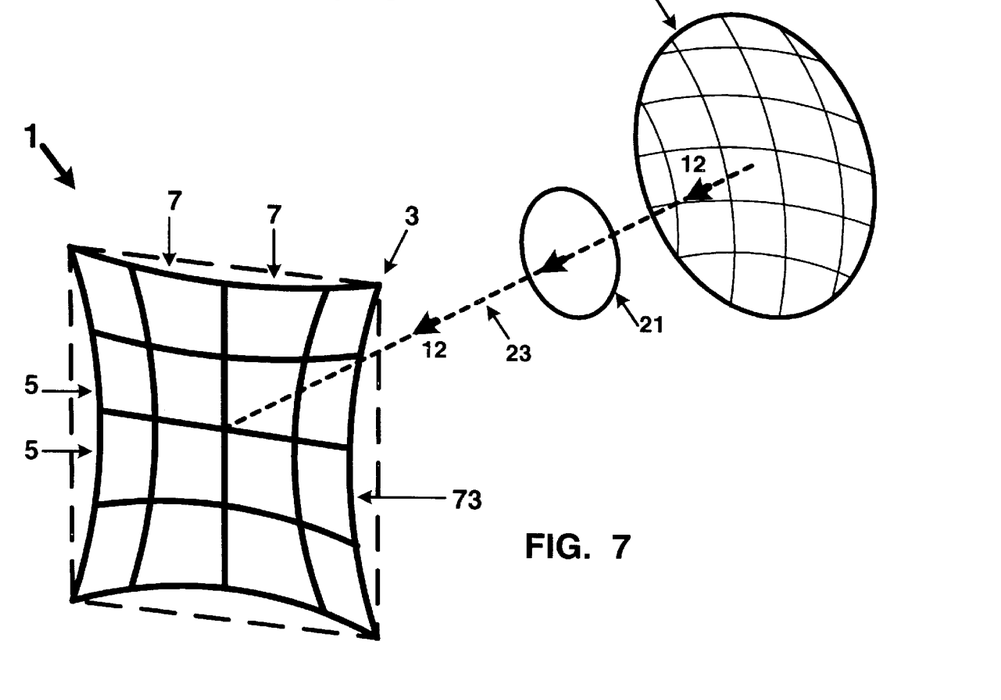
FIG. 7 is an illustration of an array having a pincushion geometry for imaging features of either a concave spherical object or through a lens with pincushion distortion according to the present invention.

In one embodiment of the present invention, as illustrated in FIG. 7, the array 3 of the image tracking device 1 has a pincushion geometry 73 so that features on a concave spherical object 63 can be imaged onto the array 3. The pincushion geometry 73 of the array 3 compensates for geometric distortions generated by the optical system 21. Note that in FIG. 7, the concave spherical object 63 is a portion of a spherical object, otherwise, if the concave spherical object 63 were a complete sphere, features on the concave surface would be completely enclosed by the sphere and could not be imaged onto the array 3.

Figure 8:
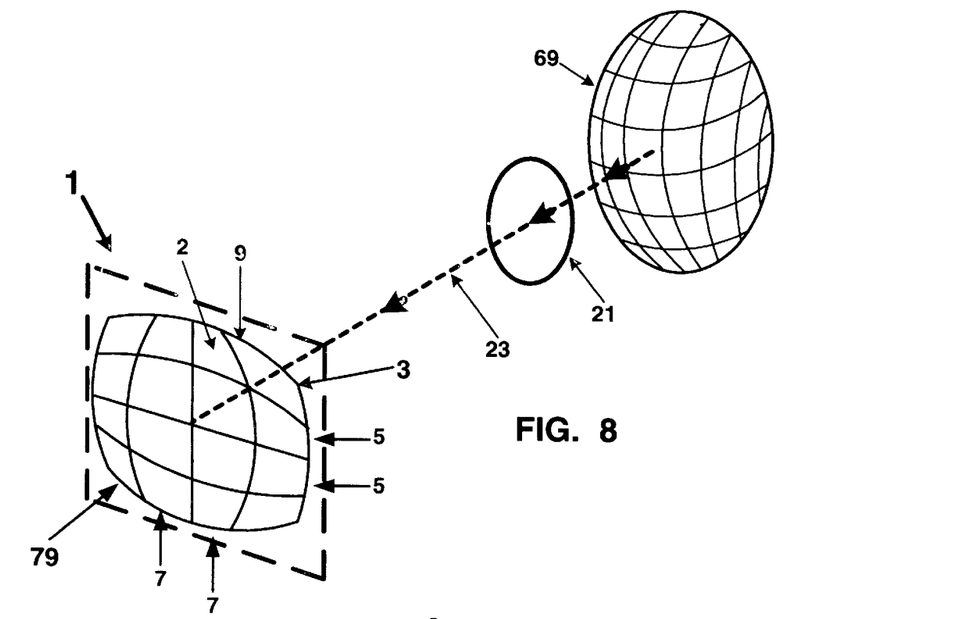
FIG. 8 is an illustration of an array having a barrel geometry for imaging features of either a convex spherical object or through a lens with barrel distortion according to the present invention.

In another embodiment of the present invention, as illustrated in FIG. 8, the array 3 of the image tracking device 1 has a barrel geometry 79 so that features on a convex spherical object 69 can be imaged onto the array 3. The barrel geometry 79 of the array 3 compensates for geometric distortions generated by the optical system 21. In FIG. 8, the convex spherical object 69 can be a portion of a spherical object.

Figure 9A:
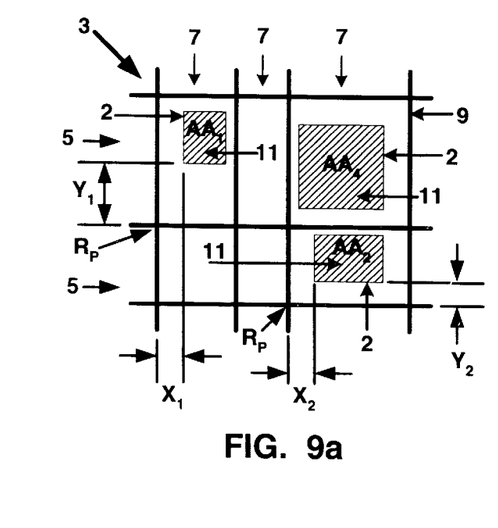
FIGS. 9a and 9b are illustrations of an array configured to compensate for optical distortions in an image according to the present invention.
Figure 9B:
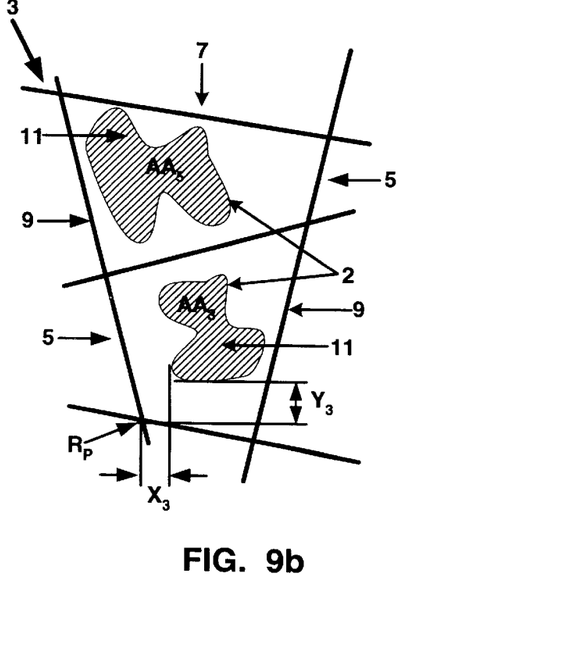

Referring to FIGS. 9a and 9b, a shape for the cell frame 9, a shape for the active area 11 of the light-sensitive elements 2, and a position of the active area 11 within the cell frame 9 can be selected so that the array 3 compensates for optical distortions in an image (not shown) that is incident on the array 3. Only a portion of the array 3 is shown in FIGS. 9a and 9b. The shape of the cell frame 9, the shape of the active area 11, and the position of the active area 11 relative to its respective cell frame 9 can vary throughout the array 3 as illustrated in FIG. 9a where the active area $AA_2$ is larger than $AA_1$. Both $AA_2$ and $AA_1$ have a rectangular shape; however, the shapes of the active areas need not be the same, for example, $AA_4$ has a square shape.

As described above, the position of the active area 11 within its respective cell frame 9 can vary throughout the array 3. In FIGS. 9a and 9b the position of the active area 11 within its associated cell frame 9 is measured from a reference point $R_P$ located at the lower left corner of that cell frame 9. For example, in FIG. 9a, active area $AA_1$ has an x-coordinate of $X_1$ and a y-coordinate $Y_1$ measured from the reference point $R_P$ located in the lower left corner of its cell frame 9. Similarly, in FIG. 9b, active area $AA_3$ has an x-coordinate of $X_3$ and a y-coordinate $Y_3$ measured from the reference point $R_P$ located in the lower left corner of its cell frame 9.

Coordinate systems other than a Cartesian coordinate system can be used to locate the position of the active area 11 within the cell frame 9. Moreover, the coordinate system need not be referenced to the cell frame 9. A central point of symmetry within the array 3 can be used as the reference point for the coordinate system. On the other hand, a point outside of the array 3 can be used as the reference point.

The shape of the active area 11 need not be rectangular, as shown in FIG. 9b. One advantage of the tracking device 1 of the present invention is that the shape of the active area 11 can be selected based on the application, on the type of image distortion to be compensated for, on specific characteristics of an image, or on the shape of feature trajectories in an image of a moving object. Accordingly, the active area 11 can have a shape that does not conform to conventional shapes for the active areas of light-sensing devices. As illustrated in FIG. 9b, active areas $AA_3$ and $AA_5$ can include curved non-regular shapes for the active area 11, for example.

FIGS. 9a and 9b also illustrate that the array 3 can be laid out in a non-rectilinear geometry that includes straight lines that define the rows 5 and the columns 7 as shown in FIG. 9a; however, the spacing between the rows 5 and the columns 7 varies within the array 3 to define the non-rectilinear geometry (i.e. the rows and columns have a non-regular spacing). In contrast, the non-rectilinear geometry of the array 3 can be defined by straight lines that do not intersect at right angles to define the rows 5 and the columns 7 as shown in FIG. 9b. As mentioned above, the spacing between the rows 5 and the columns 7 varies within the array 3 of FIG. 9b to define the non-rectilinear geometry.

Figure 10A:
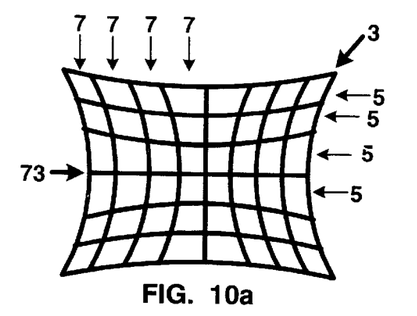
FIGS. 10a through 10e are illustrations of arrays laid out in various geometric patterns according to the present invention.
Figure 10B:
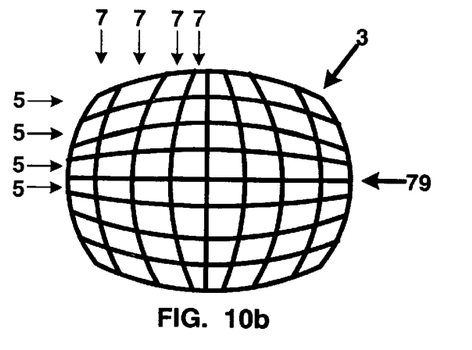
Figure 10C:
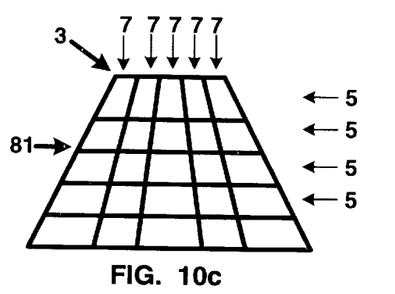
Figure 10D:
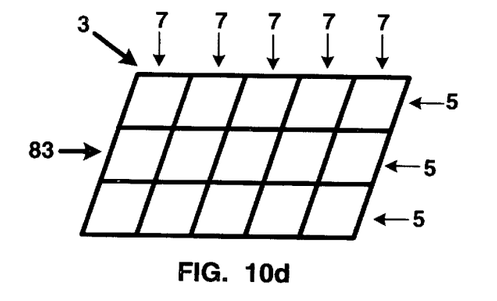
Figure 10E:
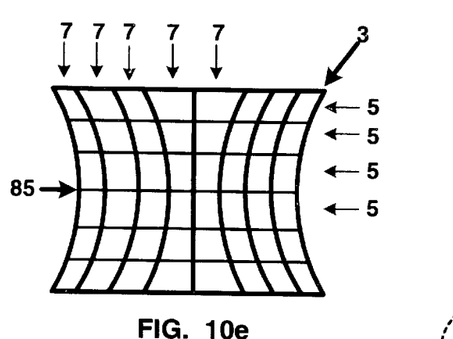

In one embodiment of the present invention, the geometry of the array 3 can be laid out in a pincushion pattern 73 as illustrated in FIG. 10a, a barrel pattern 79 as illustrated in FIG. 10b, a trapezoid pattern 81 as illustrated in FIG. 10c, a parallelogram pattern 83 as illustrated in FIG. 10d, and a keyhole pattern 85 as illustrated in FIG. 10e. The keyhole pattern 85 differs from the pincushion pattern 73 in that the rows 5 have horizontal lines whereas in the pincushion pattern 73 the rows 5 have arcuate lines.

Figure 10F:
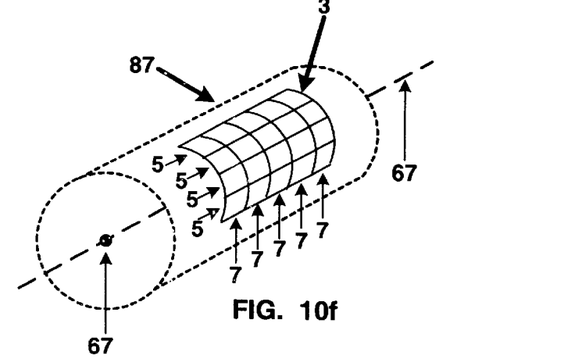
FIG. 10f is an illustration of an array having a cylindrically symmetric geometry about a center axis of symmetry according to the present invention.

In another embodiment, the array 3 includes a portion of a cylindrically symmetric geometry 87 having a center line of symmetry 67 as illustrated in FIG. 10f. The array 3 can be disposed on a flexible substrate such as a flexible circuit board and formed by using a cylindrical mandrel as a preform to support the array 3 and to transfer its cylindrical shape to the array 3.

Figure 11:
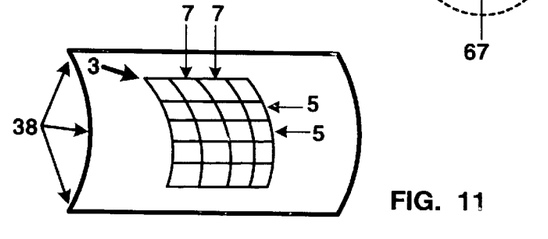
FIG. 11 is an illustration of an array disposed on a curved surface according to the present invention.

In one embodiment, the array 3 lies on a curved surface 38 as illustrated in FIG. 11. The array 3 can be disposed on the curved surface 38, or the array 3 can be disposed on a flexible material, such as a flexible PC board, for example, and then conformally disposed on the curved surface 38. For instance, the curved surface 38 can be any curved surface such as a spherical surface or a portion thereof, or a cylindrical surface or a portion thereof.

In the embodiments illustrated in FIGS. 10a thru 10f and in FIG. 11, the rows 5 and the columns 7 are arranged in a non-rectilinear geometry and the shape of the cell frame 9, the shape of the active area 11, and the position of the active area 11 within the cell frame 9 is selected to compensate for optical distortions in an image (not shown) that is incident on the array 3.

Figure 12:
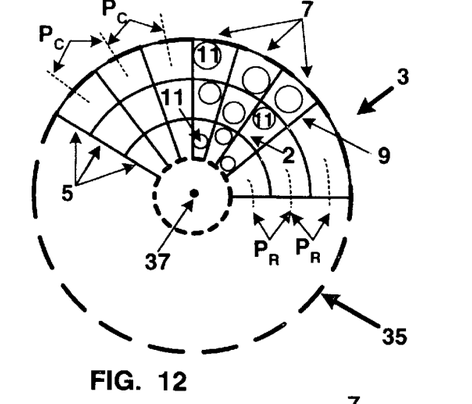
FIG. 12 is an illustration of an array configured to minimize aliasing by randomly positioning each light-sensitive element within its respective cell frame according to the present invention.

Referring to FIG. 12, the array 3 includes a plurality of rows 5. The distance between cells frames 9 in adjacent columns 7 defines a column cell pitch $P_C$ that is different within each row 5, and the distance between cell frames 9 in adjacent rows 5 defines a row cell pitch $P_R$. The active area 11 of each light-sensitive element 2 in each cell frame 9 is randomly positioned within that cell frame 9. The random position of the active area 11 in the cell frame 9 is operative to minimize aliasing due to images (not shown) that have some spatial periods that are less than about twice the row cell pitch $P_R$, within each row 5, or less than about twice the column cell pitch $P_C$ for that row. It is assumed in this case that spatial frequencies in the image, in directions parallel to rows, increase with increasing radius from the center 37.

Figure 13:
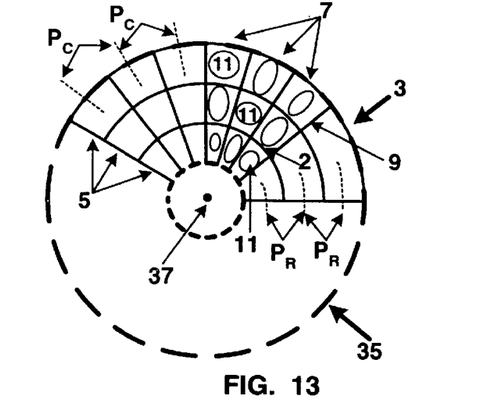
FIG. 13 is an illustration of an array configured to minimize aliasing by randomly selecting the active area of each light-sensitive element within the array according to the present invention.

In another embodiment of the present invention as illustrated in FIG. 13, the array 3 includes a plurality of rows 5. The distance between cells frames 9 in adjacent columns 7 defines a column cell pitch $P_C$ that is different within each row 5, and the distance between cell frames 9 in adjacent rows 5 defines a row cell pitch $P_R$. The active area 11 of each light-sensitive element 2 in each cell frame 9 is randomly selected so that the fill-factor varies throughout the array 3. The random selection of the active area 11 for each cell frame 9 is operative to minimize aliasing due to images (not shown) that have some spatial periods that are less than about twice the row cell pitch $P_R$, within each row 5, or less than about twice the column cell pitch $P_C$ for that row. As before, it is assumed that spatial frequencies in the image, in directions parallel to rows, increase with increasing radius from the center 37.

The array's 3 of FIGS. 12 and 13 are portions of a circularly symmetric geometry 35 having a center point of symmetry 37. Spatial periods in an image from an object (not shown) such as an encoder disc in a rotary encoder, for example, can be made to travel along the rows 5 of the array 3 by aligning an axis of rotation of the object to intersect the center point of symmetry 37. Aliasing can be frustrated by randomly positioning each active area 11 within its respective cell frame 9 as shown in FIG. 12 so that the active area 11 is displaced from an otherwise regular pattern within the array 3. In the embodiment illustrated in FIG. 12, within each row 5 of the array 3, the active area 11 of light-sensitive elements 2 in that row 5 have the same surface area. Only the position of the active area 11 within the cell frame 9 is randomized.

Alternatively, in the embodiment illustrated in FIG. 13, aliasing can be frustrated by randomizing the active area 11 in each cell frame 9 so that the fill-factor of each cell frame 9 varies randomly throughout the array 3. As can be seen in FIG. 13, the center position of the active area 11 in the cell frame 9 does not vary relative to its representative cell frame, rather it is the active area 11 that varies throughout the array 3.

Although the array 3 as illustrated in FIGS. 12 and 13 is a portion of the circularly symmetric geometry 35, other array geometries can be used to frustrate aliasing, and the array 3 is not limited to the circularly symmetric geometry 35. For instance, the array 3 can be laid out as illustrated in FIGS. 9a and 9b, or FIGS. 10a thru 10f.

Figure 14:
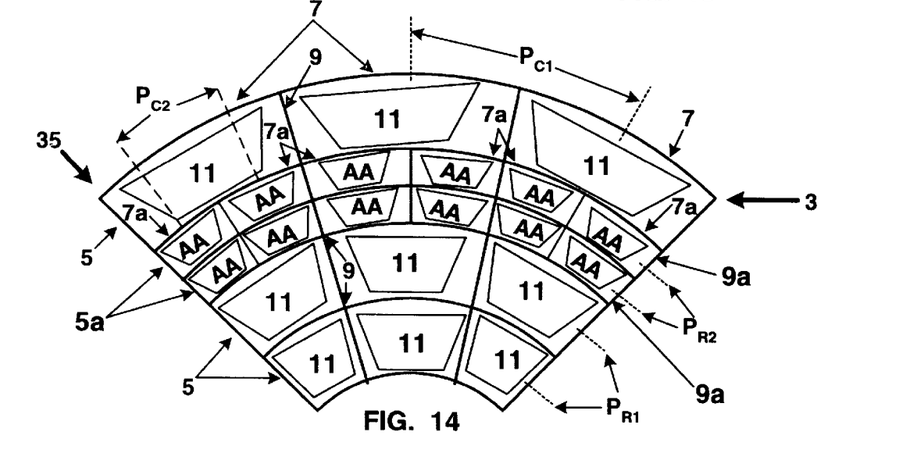
FIG. 14 is an illustration of a non-rectilinear and non-regular array wherein the row cell pitch and the column cell pitch are varied to resolve an image with greater resolution according to the present invention.

In one embodiment of the present invention as illustrated in FIG. 14, the array 3 has a plurality of rows 5 and 5a, and columns 7 and 7a. The distance between cells frames 9 in adjacent columns 7 defines a column cell pitch $P_{C1}$, and the distance between cell frames 9 in adjacent rows 5 defines a row cell pitch $P_{R1}$. Similarly, the distance between cells frames 9a in adjacent columns 7a defines a column cell pitch $P_{C2}$, and the distance between cell frames 9a in adjacent rows 5a defines a row cell pitch $P_{R2}$. The row cell pitch $P_{R1}$ is larger than the roll cell pitch $P_{R2}$ so that $P_{R1} > P_{R2}$. Similarly, the column cell pitch $P_{C1}$ is larger than the column cell pitch $P_{C2}$ so that $P_{C1} > P_{C2}$.

The row cell pitch and the column cell pitch are selected to vary at different positions within the array 3 so that information in an image (not shown) incident on the array 3 is detected with high resolution in portions of the array 3 where the row cell pitch and/or the column cell pitch are small and is detected with low resolution in portions of the array 3 where the row cell pitch and/or the column cell pitch are large.

Therefore, as a result, the image is detected with high resolution in that portion of the array 3 defined by rows 5a and columns 7a because in that portion of the array 3 the row cell pitch $P_{R2}$ and the column cell pitch $P_{C2}$ are smaller. Resulting is a smaller cell frame 9a defined by the intersection of each row 5a with each column 7a. The portion of the image that is incident on the active area AA in each cell frame 9a is detected with high resolution due to a larger number of active areas per unit area available to read that portion of the image. As can be seen from FIG. 14, four of the cell frames 9a occupy approximately the same area as one of the cell frames 9. However, the four cell frames 9a include four active areas AA, whereas, any cell frame 9 has only one active area 11. Consequently, image data from the portion of the image that is incident on the four active areas AA will be represented by four of the electronic signals from those four active areas as compared to only one electronic signal from the active area 11. Essentially there are more light-sensitive elements per unit of area in the region of the array 3 defined by rows 5a and columns 7a.

The high and low resolution portions of the array 3 can be used to track motion of an object (not shown) having features of varying degrees of detail that are patterned on a surface of the object. For example, if the object is an encoder disc in a shaft encoder, a portion of the disc can have a fine pattern disposed thereon and other portions of the disc can have a coarse pattern disposed thereon. An axis of rotation of the object can be aligned with a center point of symmetry (not shown) of the array 3 so that an image of both the fine and coarse patterns traverses the rows 5a and 5 of the array 3 respectively, with the image of the fine pattern traversing the rows 5a and the image of the coarse pattern traversing the rows 5. That is, image data from the active areas AA can be used for tracking motion of the object with greater accuracy and precision than the image data from the active areas 11.

Figure 15:
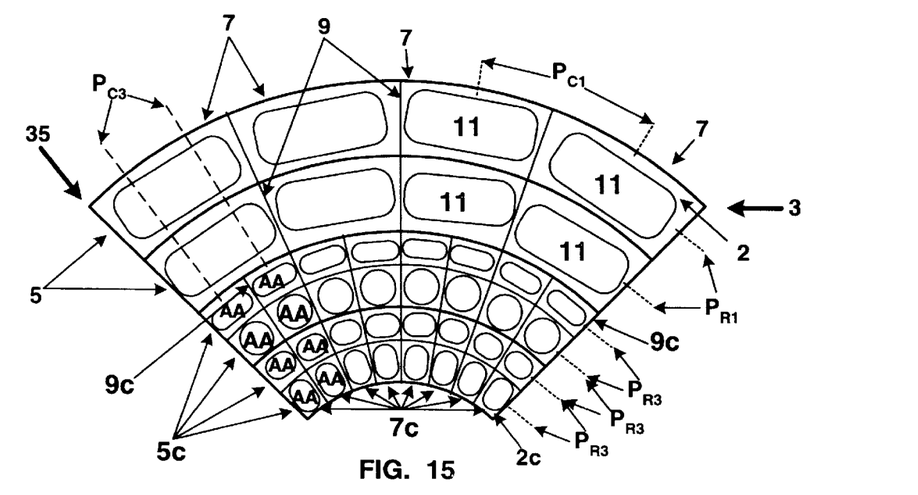
FIG. 15 is an illustration of a non-rectilinear and non-regular array wherein the row cell pitch and column cell pitch are varied to resolve an image with greater resolution at a central portion of the array according to the present invention.

In another embodiment of the present invention as illustrated in FIG. 15, the array 3 includes a central portion where the row cell pitch $P_{R3}$ and the column cell pitch $P_{C3}$ are small and an outer portion where the row cell pitch $P_{R1}$ and the column cell pitch $P_{c1}$ are large so that information in a first region of an image (not shown) incident on the central portion of the array 3 is resolved with higher resolution than information in a second region of the image incident on the outer portion of the array 3. In FIG. 15, the central portion of the array 3 is defined by rows 5c and columns 7c, and the outer portion is defined by rows 5 and columns 7. The row and column cell pitch is smaller in the central portion of the array 3 so that $P_{R3}<P_{R1}$ and $P_{C3}<P_{C1}$.

Due to the smaller pitches near the center of the array 3 and the larger pitches at the outer positions father out from the center of the array 3, the array 3 has greater image resolution near the central portion much like human retina performance. The greater image resolution in the central portion is due to the smaller size and greater number of the active areas AA disposed in the cell frames 9c. Another advantage is that lower fill-factors in the outer portion of the array 3 enable routing of control and signal lines from the outer portion of the array 3 to the light-sensitive elements 2c in the central portion.

Although the arrays 3 as illustrated in FIGS. 14 and 15 comprise portions of the circularly symmetric geometry 35, other geometries can be used to implement the array. The geometry of the array 3 will depend on the specific application. Therefore, the geometry of the array 3 is not to be construed as being limited to the forms illustrated herein.

Figure 16:
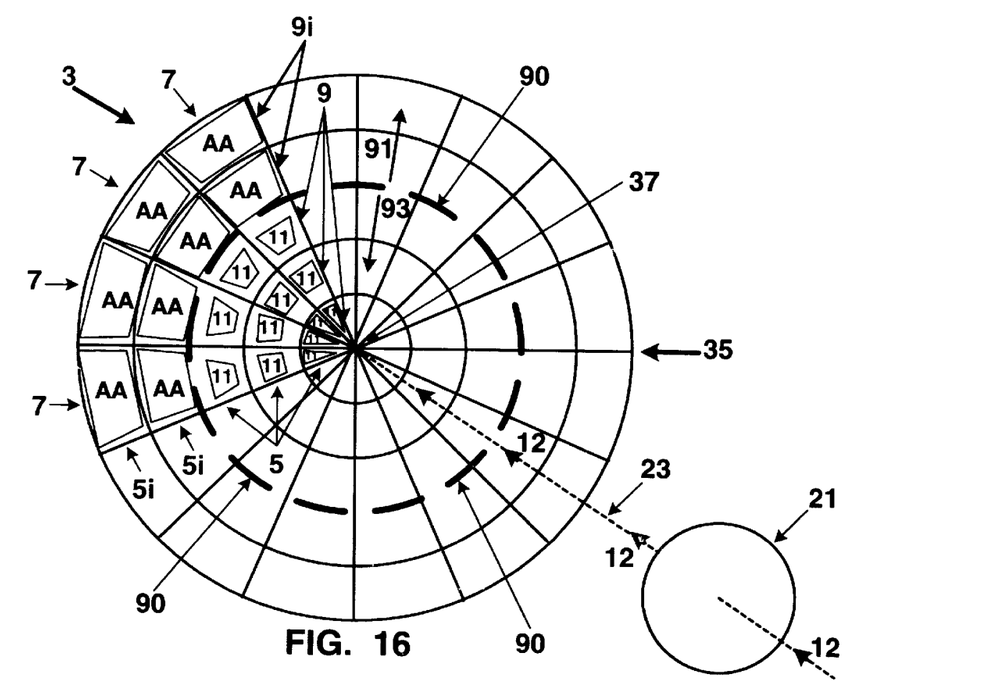
FIG. 16 is an illustration of an array wherein cell frames having a larger active area are dispose outward of an illumination boundary according to the present invention.

In one embodiment of the present invention, as illustrated in FIG. 16, the array 3 is positioned substantially at an image plane (not shown) of an optical system 21 and the array 3 includes a center point of symmetry 37 that is substantially coincident with an optical axis 23 of the optical system 21. An illumination-threshold boundary 90 (shown in dashed outline) is defined at a predetermined radial distance from the center point of symmetry 37, and cell frames 9i disposed radially outward 91 from the boundary 90 have larger active areas AA than the active areas 11 in cell frames 9 that are disposed radially inward 93 of the boundary 90. The larger active areas AA compensate for illumination fall-off in a portion of an image (not shown) that is incident on the cell frames 9i that are disposed radially outward 91 of the boundary 90. Light rays 12 shown along the optical axis 23 are some of those comprising the illumination forming the image (not shown) at the array 3.

As can be seen in FIG. 16, the cell frames 9i that have the larger active areas AA are disposed in rows 5i of the array 3, and those rows are disposed radially outward 91 of the boundary 90. On the other hand, the cell frames 9 that have the smaller active areas 11 are disposed in rows 5 of the array 3, and those rows are disposed radially inward 93 of the boundary 90. Although the array 3 is illustrated as being a portion of a circularly symmetric geometry, the array 3 can be configured as a complete circle. Moreover, the geometry of the array 3 need not be a circle or a portion thereof. The geometry of the array 3 will depend on the specific application. Therefore, the geometry of the array 3 is not to be construed as being limited to the forms illustrated herein.

Non-uniform image-field illumination can be compensated for by the array illustrated in FIG. 16. For example, if illumination intensity falls-off with increasing radial distance from the optical axis 23 of the optical system 21, the position of the illumination-threshold boundary 90 can be chosen based on known characteristics of the optical system 21 or on a curve of illumination intensity versus radial distance from the optical axis 23. Some point on that curve can be selected to determine the radially outward position for the larger active areas AA. Because the light-sensitive elements in the cell frames 9i have the larger active areas AA, the electrical signal from those light-sensitive elements can be boosted in magnitude and thus adjusted relative to the otherwise stronger electrical signals from the active areas 11 in cell frames 9. Therefore, the light-sensitive elements in the cell frames 9i can generate electrical signals that compensate for the decreased intensity of image illumination incident on those outer light-sensitive elements.

Figure 17:
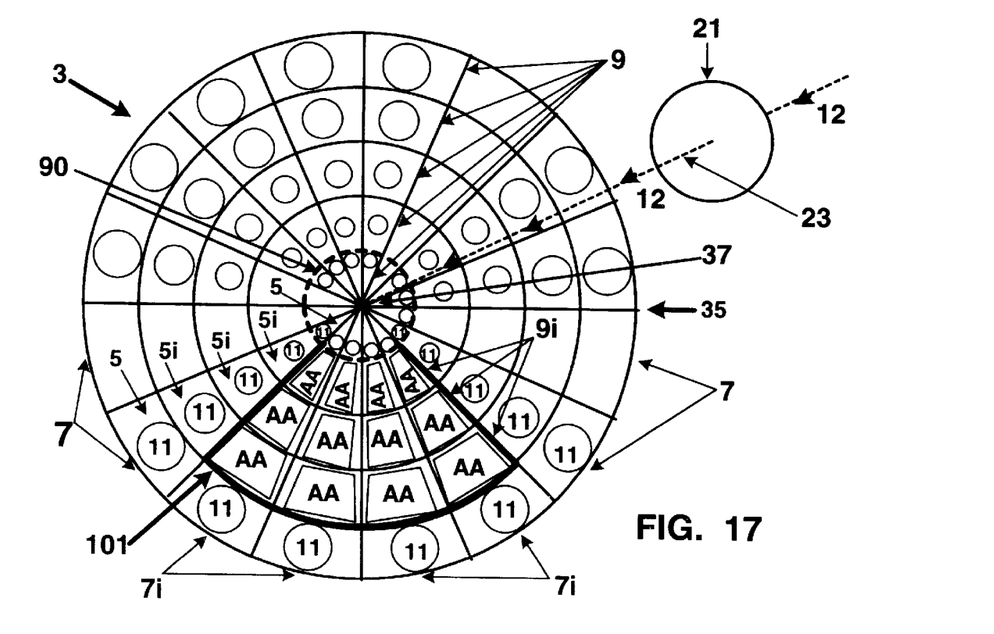
FIG. 17 is an illustration of an array having cell frames with active areas adjusted to compensate for illumination variance within a discrete illumination field according to the present invention.

In another embodiment of the present invention, as illustrated in FIG. 17, the array 3 is positioned substantially at an image plane (not shown) of an optical system 21, and the array 3 includes a center point of symmetry 37 that is substantially coincident with an optical axis 23 of the optical system 21. An illumination-threshold boundary 90 (shown in heavy dashed outline near the center point of symmetry 37) is defined at a predetermined radial distance from the center point of symmetry 37. The array 3 includes cell frames 9i that are disposed in a discrete region 101 (shown in heavy outline) of the array 3. The discrete region 101 corresponds with a specified illumination field of an image (not shown) that is incident on the cell frames 9i of the array 3. The cell frames 9i have their respective active areas AA adjusted to produce a predetermined electrical signal so that illumination variance within the specified illumination field is substantially compensated for by the adjustments to the active areas AA. Light rays 12 shown along the optical axis 23 are some of those comprising the illumination forming the image (not shown).

Referring to FIG. 17, the discrete region 101 is defined by the cell frames 9i that are disposed in rows 5i and columns 7i of the array 3. The rows 5i begin at a position that is radially outward of the boundary 90; however, the rows 5i do not extend to a perimeter of the array 3 and terminate at row 5. Within the discrete region 101, each cell frame 9i has a light-sensitive element having the active area AA. The remainder of the cell frames 9 in the array 3 are populated with light-sensitive element having an active area 11. Although the array 3 has a circular geometry, the array 3 need not be circular. The geometry of the array 3 is not to be construed as being limited to the form shown in FIG. 17. Moreover, the shape of the discrete region is not limited to the pie-shaped section illustrated in FIG. 17. The shape of the discrete region will be application dependent and will also depend on the shape and characteristics of the specified illumination field.

Figure 18:
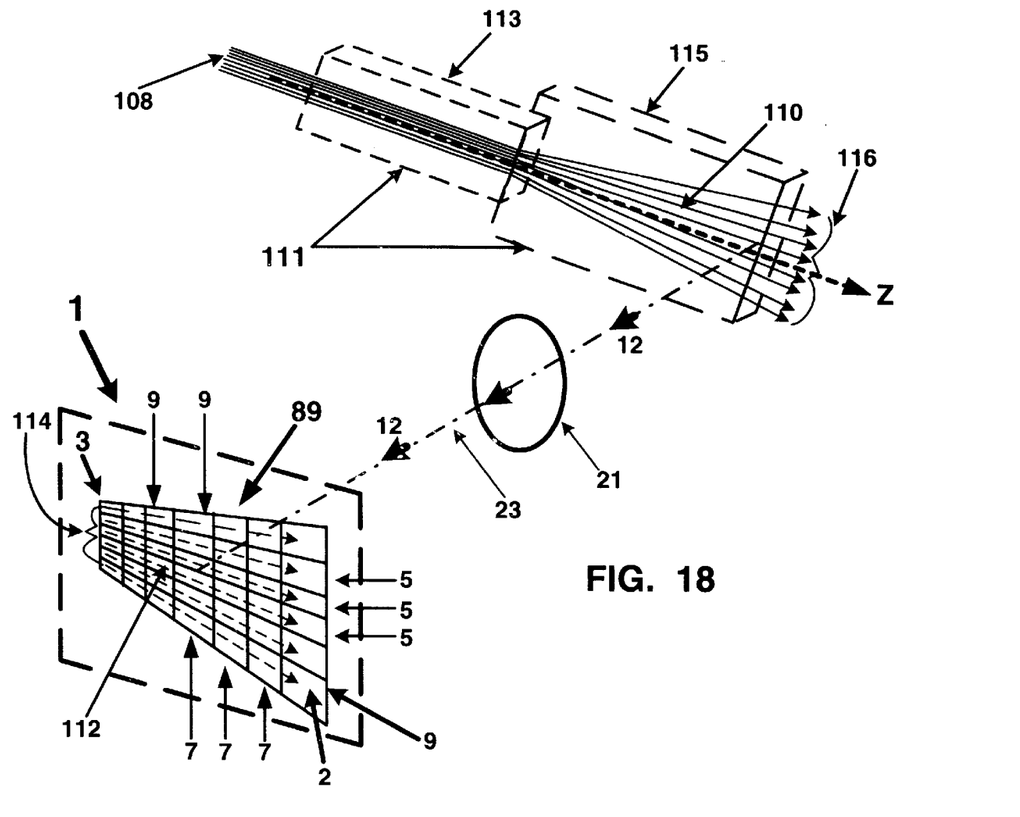
FIG. 18 is an illustration of an array having rows and columns arranged to track fluid motion according to the present invention.

In one embodiment of the present invention, as illustrated in FIG. 18, a complex motion such as a fluid motion, for example, can be tracked by the image tracking device 1. A fluid 108 enters a channel 111 at first section 113 (shown in dashed outline). As the fluid 108 flows through the channel 111, the fluid 108 transitions into a second section 115 (also shown in dashed outline) of the channel 111. After the transition into the second section 115, the fluid 108 becomes a divergent fluid stream 110 having fluid motion in a direction shown by arrows 116. An optical system 21 forms an image of the fluid motion on an array 3 having a shape 89 that matches a predetermined region of the fluid motion of the fluid stream 110. The rows 5 and columns 7 of the array 3 are arranged so that the complex motion of the fluid stream 110 is reduced to a uniform cell-frame-to-cell-frame motion 112 (i.e. from a cell frame 9 to an adjacent cell frame 9 in the same row 5) throughout the array 3 as shown by dashed arrows 114.

Although FIG. 18 illustrates the fluid stream 110 diverging in a linear manner along an axis of flow Z of the channel 111, the fluid stream 110 can diverge in a non-linear manner along the axis of flow Z. For instance, the fluid stream 110 can diverge more rapidly with increasing distance (as along an arc) along the axis of flow Z. Accordingly, the rows 5 and columns 7 of the array 3 can be arranged in an arcuate shape to reduce the complex motion of the fluid stream 110 into a uniform cell-frame-to-cell-frame motion throughout the array 3.

Figure 19A:
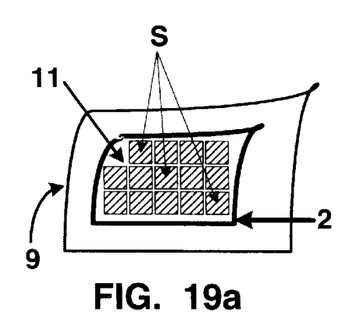
FIGS. 19a through 19d illustrates the use of subpixels to implement a light-sensitive element according to the present invention.
Figure 19B:
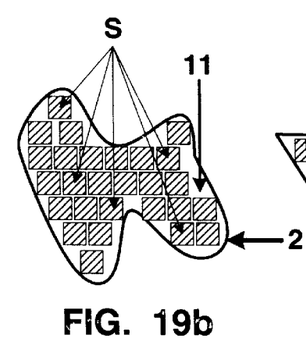
Figure 19C:
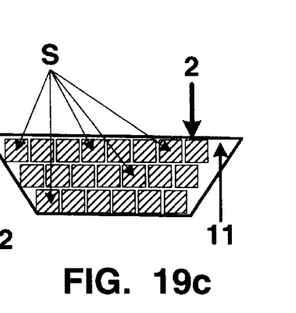

FIGS. 19a, 19b, and 19c, illustrate the use of a plurality of subpixels S to implement the light-sensitive element 2 of the present invention. The subpixels S may be arranged within the light-sensitive element 2 to approximate the desired shape of the active area 11. The shape of the subpixels S can be square or rectangular as shown in FIGS. 19a, 19b, and 19c; however, the subpixels S can be any shape. For Example, the subpixels S can be circular, hexagonal, triangular, or oval. On the other hand, if design constraints do not allow non-orthogonal shapes, it may be necessary to approximate the shape of the active area 11 using rectangular or square shapes.

For each light-sensitive element 2 that has an active area 11 composed of the subpixels S, signal outputs (not shown) of the subpixels S can be electronically combined to form the output node 25 for electrical signal (not shown) for that light-sensitive element. The subpixels S can be a photodiode, a photocell, a P-I-N diode, a phototransistor, a charge coupled device, a CMOS active pixel sensor, an amorphous photosensor, a solar cell, a photovoltaic device, and a photoconductive device.

Figure 19D:
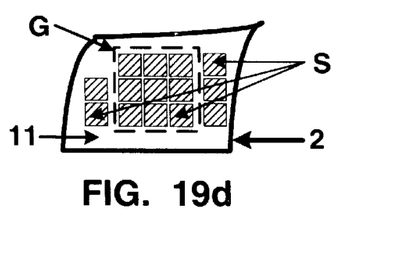

In some image tracking applications it may be desirable to dynamically adjust the active area 11 of a light-sensitive element 2 in real time. By implementing the light-sensitive element 2 with the subpixels S, the active area 11 can be increased to a maximum by selecting the signal outputs of all the subpixels S in that light-sensitive element 2. Conversely, the active area 11 can be reduced by selecting the signal outputs of less than all the subpixels S in that light-sensitive element 2 as illustrated in FIG. 19d. The active area 11 of FIG. 19a which consists of fourteen (14) of the subpixels S is reduced in FIG. 19d to a subpixel group G (shown in dashed outline) of nine (9) of the subpixels S. Resulting is a reduced fill-factor. Additional benefits of using the subpixels S include increasing or decreasing the resolution of the light-sensitive element 2 by selecting all or only a portion of the signal outputs from the subpixels S in that light-sensitive element 2, or the shape of the active area 11 can modified by selecting specific subpixels S such that the selection forms a predetermined pattern. For instance, the adjustment to the active area 11 of FIG. 19a results in the active area 11 being transformed from a substantially rectangular shape in FIG. 19a to a square shape in FIG. 19d as shown by the dashed outline of the subpixel group G.

Although several embodiments of the present invention have been disclosed and illustrated, the invention is not limited to the specific forms or arrangements of parts so described and illustrated. The invention is only limited by the claims.

What is claimed is:

1. An image tracking device, comprising:
a plurality of light-sensitive elements configured to define an array,
the array having a row and a plurality of columns intersecting the row,
the row and the columns arranged in non-rectilinear geometry,
each intersection of the row with one of the columns defining a cell frame having a frame area within which one of the light-sensitive elements is located,
each light-sensitive element having an active area,
a fill-factor for one of the cell frames being defined as the ratio of the active area of the light-sensitive element located in that cell frame to the frame area of that cell frame,
each light-sensitive element is operative to generate an electrical signal responsive to a portion of an image of an object incident on the active area of that light-sensitive element, and
wherein a shape of the cell frame, a shape of the active area, and a position of the active area within the cell frame vary throughout the array and are selected to compensate for optical distortions in an image incident on the array.

2. The device of claim 1, wherein the array comprises at least a portion of a circularly symmetric geometry having a center point of symmetry.

3. The device of claim 2, wherein the array comprises a plurality of rows, pitch between the rows decreases at increasing radial distance from the center point of symmetry such that the frame area is constant across the array.

4. The device of claim 2, wherein the array further comprises:
a plurality of rows having constant pitch therebetween at increasing radial distance from the center point of symmetry, wherein at increasing radial distance from the center point of symmetry the frame area increases and the fill-factor decreases so that the active area of the cell frames is constant across the array.

5. The device of claim 2, wherein the center point of symmetry of the array is substantially coincident with an axis of rotation of the object.

6. The device of claim 1, wherein the light-sensitive element is selected from the group consisting of a photodiode, a photocell, a P-I-N diode, a phototransistor, a charge coupled device, a CMOS active pixel sensor, an amorphous photosensor, a solar cell, a photovoltaic device, and a photoconductive device.

7. The device of claim 1, wherein each column further comprises column signal means for generating a column signal, the column signal means in electrical communication with the electrical signal of each of the light-sensitive elements in that column, the column signal indicative of a combined value for all of the electrical signals in electrical communication with the column signal means, whereby image motion along the row of the array can be tracked by correlating the column signal from each column in the array.

8. The device of claim 1, wherein the row further comprises row signal means for generating a row signal, the row signal means in electrical communication with the electrical signal each of the light-sensitive elements in that row, the row signal indicative of a combined value for all of the electrical signals in electrical communication with the row signal means, whereby image motion along the columns of the array can be tracked by correlating the row signal from the row.

9. The device of claim 1, wherein the array has a pincushion geometry, whereby features on a concave spherical object can be imaged onto the array.

10. The device of claim 1, wherein the array has a barrel geometry, whereby features on a convex spherical object can be imaged onto the array.

11. The device of claim 1, wherein the row and the columns of the array are arranged to reduce a complex motion field in an image space into a uniform cell-frame-to-cell-frame motion throughout the array, whereby tracking of an image of fluid motion incident on the array is simplified by arranging the row and the columns of the array to match trajectories and motion increments of the fluid motion in the image space.

12. The device of claim 1, wherein the geometry of the array is laid out in a pattern selected from the group consisting of a pin-cushion, a barrel, a keyhole, a trapezoid, and a parallelogram.

13. The device of claim 1, wherein the array comprises a portion of a cylindrically symmetric geometry having a center line of symmetry.

14. The device of claim 1, wherein the array lies on a curved surface.

15. The device of claim 14, wherein the curved surface is a portion of sphere.

16. The device of claim 1, wherein the array further comprises:

a plurality of rows, wherein distance between cell frames in adjacent columns defines a column cell pitch and distance between cell frames in adjacent rows defines a row cell pitch, and the active area of the light-sensitive element in each cell frame is randomly positioned within that cell frame so that aliasing is minimized for images having spatial periods less than about twice the row cell pitch or less than about twice the column cell pitch.

17. The device of claim 1, wherein the array further comprises:

a plurality of rows, wherein distance between cell frames in adjacent columns defines a column cell pitch and distance between cell frames in adjacent rows defines a row cell pitch, and the active area of the light-sensitive element in each cell frame is randomly selected so that the fill-factor varies randomly throughout the array so that aliasing is minimized for images having spatial periods less than about twice the row cell pitch or less than about twice the column cell pitch.

18. The device of claim 1, wherein the array further comprises:

a plurality of rows, wherein distance between cell frames in adjacent columns defines a column cell pitch and distance between cell frames in adjacent rows defines a row cell pitch, and the row cell pitch and the column cell pitch are selected to vary at different positions within the array so that information in an image incident on the array is detected with high resolution in portions of the array where the row cell pitch and the column cell pitch are small and is detected with low resolution in portions of the array where the row cell pitch and the column cell pitch are large.

19. The device of claim 18, wherein the row cell pitch and the column cell pitch are small at a central portion of the array and the row cell pitch and the column pitch are large at an outer portion of the array so that the information in a first region of an image incident on the central portion is resolved with higher resolution than information in a second region of the image incident on the outer portion of the array.

20. The device of claim 1, wherein the array is positioned substantially at an image plane of an optical system and a center point of symmetry of the array is disposed substantially coincident with an optical axis of the optical system, and an illumination boundary is defined at a predetermined radial distance from the center point of symmetry, the cell frames disposed radially outward of the illumination boundary have larger active areas than the cell frames disposed radially inward of the illumination boundary so that the larger active areas of the cell frames disposed radially outward of the illumination boundary compensate for illumination fall-off in portions of an image incident on the radially outward cell frames.

21. The device of claim 1, wherein the array is positioned substantially at an image plane of an optical system and a center point of symmetry of the array is disposed substantially coincident with an optical axis of the optical system, and an illumination boundary is defined at a predetermined radial distance from the center point of symmetry, the cell frames disposed in a discrete region of the array correspond with a specified illumination field of an image incident on the array, the active areas of the cell frames in the discrete region are adjusted to produce a predetermined electrical signal, whereby illumination variance within the specified illumination field is substantially compensated for by the adjustments to the active areas of the cell frames within the discrete region.

* * * * *